US010997080B1

(12) United States Patent
Eliash et al.

(10) Patent No.: US 10,997,080 B1
(45) Date of Patent: May 4, 2021

(54) METHOD AND SYSTEM FOR ADDRESS TABLE CACHE MANAGEMENT BASED ON CORRELATION METRIC OF FIRST LOGICAL ADDRESS AND SECOND LOGICAL ADDRESS, WHEREIN THE CORRELATION METRIC IS INCREMENTED AND DECREMENTED BASED ON RECEIVE ORDER OF THE FIRST LOGICAL ADDRESS AND THE SECOND LOGICAL ADDRESS

(71) Applicant: Western Digital Technologies, Inc., San Jose, CA (US)

(72) Inventors: Tomer Tzvi Eliash, Sunnyvale, CA (US); Alex Bazarsky, Holon (IL); Ariel Navon, Nahal Shilo (IL); Eran Sharon, Arthur Rubinshtein (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/788,117

(22) Filed: Feb. 11, 2020

(51) Int. Cl.
*G06F 12/0871* (2016.01)

(52) U.S. Cl.
CPC .. *G06F 12/0871* (2013.01); *G06F 2212/7201* (2013.01)

(58) Field of Classification Search
CPC ......... G06F 2212/7201; G06F 12/0871; G06F 2212/312; G06F 12/0862; G06F 2212/6024–6026
See application file for complete search history.

(56) References Cited

U.S. PATENT DOCUMENTS

| 5,819,310 | A | 10/1998 | Vishlitzky et al. |
| 5,889,969 | A | 3/1999 | Getzlaff et al. |
| 6,567,865 | B1 | 5/2003 | Araki et al. |
| 6,571,318 | B1 * | 5/2003 | Sander ................ G06F 12/0862 |
| | | | 711/137 |
| 6,976,147 | B1 * | 12/2005 | Isaac .................... G06F 12/0862 |
| | | | 711/137 |

(Continued)

OTHER PUBLICATIONS

Jian Zhou et. al., A Correlation-Aware Page-Level FTL to Exploit Semantic Links in Workloads, DOI 10.1109/TPDS.2018.2871826, IEEE Transactions on Parallel and Distributed Systems.

(Continued)

*Primary Examiner* — Reginald G Bragdon
*Assistant Examiner* — Chie Yew
(74) *Attorney, Agent, or Firm* — Patterson & Sheridan, LLP; Steven H. Versteeg

(57) ABSTRACT

In a method for address table cache management, a first logical address associated with a first read command may be received. The first logical address may be associated with a first segment of an address mapping table. A second logical address associated with a second read command may then be received. The second logical address may be associated with a second segment of the address mapping table. A correlation metric associating the first segment to the second segment may be increased in response to receiving the first logical address before the second logical address. The first logical address and second logical address may each map to a physical address within the address mapping table, and a mapping table cache may be configured to store two or more segments. The mapping table cache may then be managed based on the correlation metric.

17 Claims, 10 Drawing Sheets

(56) References Cited

U.S. PATENT DOCUMENTS

| | | | |
|---|---|---|---|
| 7,120,766 B2 | 10/2006 | Ash et al. | |
| 7,392,340 B1 | 6/2008 | Dang et al. | |
| 8,898,540 B1 | 11/2014 | Ilan et al. | |
| 10,191,857 B1 | 1/2019 | Shalev | |
| 2004/0109376 A1 | 6/2004 | Lin | |
| 2013/0275679 A1 | 10/2013 | Goldberg et al. | |
| 2014/0129760 A1* | 5/2014 | Lee | G06F 12/0246 |
| | | | 711/103 |
| 2016/0246726 A1 | 6/2016 | Hahn | |
| 2017/0192902 A1 | 7/2017 | Hwang et al. | |
| 2018/0137057 A1 | 5/2018 | Hsu et al. | |
| 2019/0258585 A1 | 8/2019 | Marcu et al. | |
| 2019/0317901 A1 | 10/2019 | Kachare et al. | |
| 2020/0073794 A1* | 3/2020 | Chen | G11C 16/102 |
| 2020/0151109 A1* | 5/2020 | Cho | G06F 12/0238 |
| 2020/0233610 A1* | 7/2020 | Sun | G06F 12/126 |
| 2020/0364157 A1* | 11/2020 | Byun | G06F 12/0868 |

OTHER PUBLICATIONS

Jean Zhou, et. al., IOMeans: Ciassifying Multi-concurrent I/O Threads Using Spatio-Tempo Mapping, 2019 International Conference on High Performance Big Data and Intelligent Systems (HPBD &IS), pp. 242-247.

\* cited by examiner

CORRELATION TABLE 600

| LAST 602 | CURRENT 604 | CORRELATION METRIC 606 |
|---|---|---|
| A | B | 1 |
| B | A | 0.60 |
| ⋮ | ⋮ | ⋮ |
| D | E | 0.1 |

METHOD AND SYSTEM FOR ADDRESS TABLE CACHE MANAGEMENT BASED ON CORRELATION METRIC OF FIRST LOGICAL ADDRESS AND SECOND LOGICAL ADDRESS, WHEREIN THE CORRELATION METRIC IS INCREMENTED AND DECREMENTED BASED ON RECEIVE ORDER OF THE FIRST LOGICAL ADDRESS AND THE SECOND LOGICAL ADDRESS

BACKGROUND

Mapping table cache management is an important part of FLASH management. A mapping table cache is typically used to improve read latency by avoiding the need to perform two read operations from the NAND Flash for every host read request, due to the need to perform first the logical to physical address translation. However, due to the limited size of the cache, the cache needs to be managed to maximize the cache hit rate and minimize the cache miss rate. In conventional systems, data may be brought into the cache upon need, and a least-recently used (LRU) eviction policy may be implemented. However, these methods are sub-optimal.

Optimization of a mapping table cache use is complicated by the fact that the relevant decisions of the FLASH management (e.g., cache eviction) affect not only the immediate point of time when the decision is made, but also may have long-term effects that are harder to optimize. It is desired to manage the cache content of a mapping table cache to improve longer term performance.

BRIEF SUMMARY

This disclosure relates to a method for address table cache management. A first logical address associated with a first read command may be received. The first logical address may be associated with a first segment of an address mapping table. A second logical address associated with a second read command may then be received. The second logical address may be associated with a second segment of the address mapping table. A correlation metric associating the first logical address to the second logical address may be increased in response to receiving the first logical address before the second logical address. The first logical address and second logical address may each map to a physical address within the address mapping table, and a mapping table cache may be configured to store two or more segments. The mapping table cache may then be managed based on the correlation metric.

This disclosure further relates to an apparatus for address table cache management. The apparatus may comprise a processor and a memory. The memory may store instructions that, when executed by the processor, configure the apparatus to receive a first read command comprising a first logical address, wherein a first segment of a mapping table cache comprises the first logical address. The instructions may further configure the apparatus to receive a second read command comprising a second logical address, wherein a second segment of an address mapping table comprises the second logical address. The apparatus may then increase a correlation metric that correlates the first segment to the second segment in response to the mapping table cache failing to include the second segment and in response to receiving the first read command before the second read command. The apparatus may also be configured to manage the mapping table cache based on the correlation metric.

This disclosure finally relates to a system for address table cache management. The system may comprise a non-volatile memory, a volatile memory, an input/output interface, a cache manager, a cache segment manager, a cache loader, and a storage controller. The non-volatile memory may be configured to store an address mapping table. The volatile memory may be configured to store a mapping table cache comprising a set of segments. Each segment may comprise an address mapping between a logical block address (LBA) and a physical block address. The input/output interface may be configured to receive a storage command. The storage command may comprise a logical address that uniquely identifies a set of data blocks stored on the non-volatile memory. The cache manager may be configured to load segments from the address mapping table of the non-volatile memory into the mapping table cache of the volatile memory. The cache segment manager may be configured to manage an LBA correlation table. The LBA correlation table may comprise a correlation metric for each of a plurality of segments based on read command requests for LBAs of segments of the plurality of segments. The cache loader may be configured to retrieve an uncached segment from the address mapping table of the non-volatile memory in response to the uncached segment having a higher correlation metric than one or more correlation metrics of a resident segment and other segments in the mapping table cache. The storage controller may also be configured to service the storage command using a physical address provided by the cache manager.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates an LBA correlation table 600 in accordance with one embodiment.

DETAILED DESCRIPTION

Figure 1:
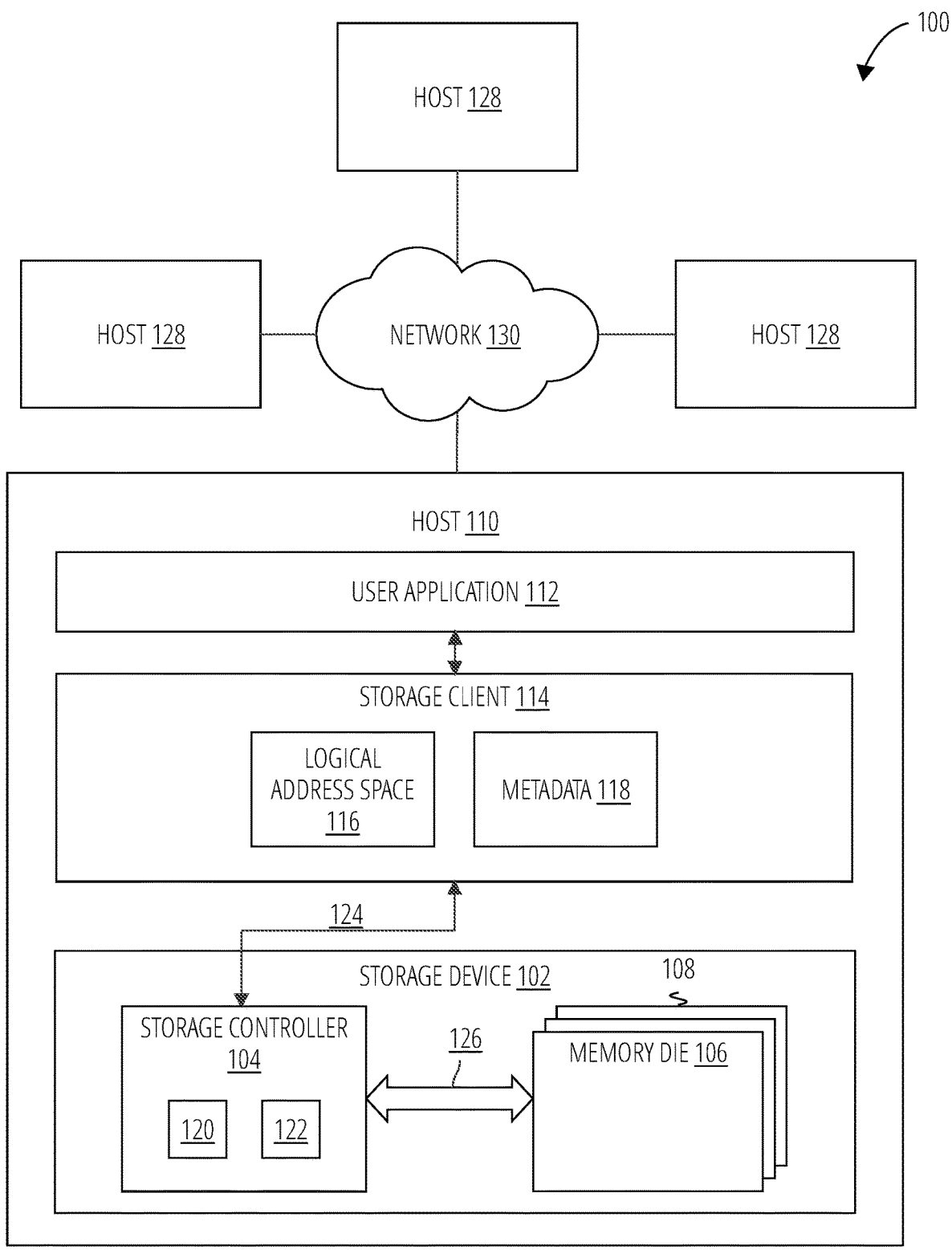
FIG. 1 is a block diagram of a storage system 100 in accordance with one embodiment.

In this invention, Hebbian Learning rules may be used for flash management in storage devices and more particularly for cache management. "Storage device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

The embodiments of this disclosure propose an apparatus, a system, and a scheme to manage an address cache based on mapping strongly correlated logical block addresses (LBA) and/or LBA ranges in real-time using Hebbian learning rules as proposed below. (Reference to a single LBA or to one or more LBA ranges may be used interchangeably herein.) Hebbian learning rules identifies how much weight to assign to an association between two concepts, objects, or things, based on an activity or event that indicated the association/relationship.

Strongly correlated LBAs may be mapped on the fly using Hebbian learning rules during the device lifetime. Next, the LBA correlation mapping may be used to improve storage device performance by improving the following flash management operations:
1. Eviction of segments having LBAs that are weakly correlated with LBAs of other segments.
2. Upload segments from non-volatile storage media according to learned LBA correlations.
3. Management storage controller table consolidation and updates according to strongly correlated LBAs.
4. Pro-active NAND flash compaction operations according to strongly correlated LBAs and according to a valid data counter (VC=0) where strongly correlated LBAs may be moved by a background operation to a common physical erase block and organized into common segments.

"Segment" refers to a data structure configured to store a logical address and a physical address associated with the logical address. In one embodiment, the logical address may comprise an LBA range and the physical address may comprise a corresponding physical block address range. "Segment size" refers to a number of bytes of data that taken together define a segment. In certain embodiments, a segment may include metadata associated with the segment. In such embodiments, the segment size may include the metadata.

A correlation between LBAs may be managed at a segment level. Segments may initially be organized by splitting an address mapping table into several segments. While the number of segments may affect the efficiency of an LBA correlation table, splitting the address mapping table into a greater number of segments may provide better granularity and thus a higher hit rate. "Hit rate" refers to a measure of how often an LBA or LBA range is requested by a host and a segment that includes the requested LBA or LBA range is in a cache. Hit rate may be tracked for each segment. Hit rate may be expressed as a whole number, real number, decimal number, or as a percentage.

One formula for calculating the hit rate may include dividing a count for the number of requests for an LBAs of a segment that is in a cache by a total number of LBA requests services. For example, suppose out of 1000 LBA requests, 500 were for requests for LBAs that are within a given segment A. In this example, the hit rate is 0.5 or 50%.

A storage controller may maintain an LBA correlation table containing a "correlation metric." "Correlation metric" refers to a measure, score, or rating of a magnitude of a relation, association, or correlation for a sequential order for requesting, identifying, or receiving a first logical address followed by a second logical address. In certain embodiments, a correlation metric may be measured in relation to a period of time. In certain embodiments, the higher the correlation metric, the stronger or higher the likelihood that the second logical address will be requested, identified, or received immediately, or shortly, after the first logical address. A correlation metric may be associated with any scale or unit of measure that conveys at a suitable level of granularity the association, relation, or correlation. For example, in one embodiment, the correlation metric is associated with a scale of real numbers between 0 and 1 in which a 0 on the scale represents a very low or non-existent correlation and a 1 on the scale represents a very high or likely correlation between the order in which the first logical address is requested will be followed by a request for second logical address. Such a scale of between 0 and 1 may be readily converted into a percentage for representing the correlation metric. In another example, in one embodiment, the correlation metric is associated with a scale of whole numbers between 1 and 10 in which a 1 on the scale represents a little, or no correlation and a 10 on the scale represents a maximum or high correlation. The storage controller may have the capability to identify a currently requested LBA and a previously requested LBA. In certain embodiments, a storage controller may be configured to maintain a history of how often a currently requested LBA is requested immediately after a particular previously requested LBA. Each time a host system requests a storage operation, such as a read command, to a particular LBA and subsequently requests another LBA from a different segment, the storage controller may increase a correlation metric for the two cache segments within the LBA correlation table. In some embodiments, requesting an LBA from a different segment may reduce a correlation metric that includes the LBA.

For data that is homogenously spread over a non-volatile storage media, an average correlation metric may be $-\frac{7}{8}*X$, where X equals number of LBA accesses serviced. Data access and the related logical addresses may not be purely random, and there may be a correlation between LBAs, and an average score per segment may be biased. In one embodiment, while a very strong correlation may result in a positive number, a moderate correlation may result in small negative number, and weak correlation may yield a large negative number.

One embodiment of an LBA correlation table may be built and maintained such that a storage controller may "predict" which segments should be prefetched volatile memory, such as an address mapping table cache, in order to increase a possibility of a cache "hit". Another byproduct may be defragmentation of the cache and the actual data that is stored in the non-volatile memory device.

FIG. 1 is a schematic block diagram illustrating one embodiment of a storage system 100 that includes a zoned storage device in accordance with the disclosed solution. The storage system 100 comprises a storage device 102, a storage controller 104, a memory die 106, a host 110, a user application 112, a storage client 114, a logical address space 116, a metadata 118, a FLASH translation layer 120, an address mapping table 122, a data bus 124, a bus 126, at least one host 128, and a network 130.

The storage system 100 includes at least one storage device 102, comprising a storage controller 104 and one or more memory die 106, connected by a bus 126. In some embodiments, the storage system 100 may include two or more memory devices. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on. "Non-volatile memory" refers to shorthand name for non-volatile memory media. In certain embodiments, non-volatile memory media refers to the non-volatile memory media and the logic, controllers, processor(s), state machine(s), and/or other periphery circuits that manage the non-volatile memory media and provide access to the non-volatile memory media.

"Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

"Memory" refers to any hardware, circuit, component, module, logic, device, or apparatus configured, programmed, designed, arranged, or engineered to retain data. Certain types of memory require availability of a constant power source to store and retain the data. Other types of memory retain and/or store the data when a power source is unavailable.

"Memory die" refers to a piece of semiconducting material made in such a way that one or more circuits are formed on, below, or within one or more layers of semiconducting material(s). Integrated circuits, and memory circuits in particular, may be mass produced on a wafer of electronic-grade silicon (EGS) or other semiconductor material (such as GaAs). The wafer is divided into small sections that each include an independent version of an integrated circuit. The sections are referred to herein as "die" or "memory die."

A memory die is a die, in one embodiment, that includes a functional circuit for operating as a non-volatile memory media and/or a non-volatile memory array. "Non-volatile memory media" refers to any hardware, device, component, element, or circuit configured to maintain an alterable physical characteristic used to represent a binary value of zero or one after a primary power source is removed. Non-volatile memory media may comprise one example of non-volatile storage media. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Non-volatile memory media may comprise one or more non-volatile memory elements, which may include, but are not limited to: chips, packages, planes, memory die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

"Non-volatile storage media" refers to any hardware, device, component, element, or circuit configured to maintain an alterable physical characteristic used to represent a binary value of zero or one after a primary power source is removed.

"Non-volatile memory array" refers to a set of non-volatile storage cells (also referred to as memory cells or non-volatile memory cells) organized into an array structure having rows and columns. A memory array is addressable using a row identifier and a column identifier.

Each storage device 102 may include two or more memory die 106, such as flash memory, nano random-access memory ("nano RAM or NRAM"), magneto-resistive RAM ("MRAM"), dynamic RAM ("DRAM"), phase change RAM ("PRAM"), etc. In further embodiments, the data storage device 102 may include other types of non-volatile and/or volatile data storage, such as dynamic RAM ("DRAM"), static RAM ("SRAM"), magnetic data storage, optical data storage, and/or other data storage technologies. The memory die 106 may be configured into a memory array 108.

"Memory array" refers to a set of storage cells (also referred to as memory cells) organized into an array structure having rows and columns. A memory array is addressable using a row identifier and a column identifier. "Memory cell" refers to a type of storage media configured to represent one or more binary values by way of a determinable physical characteristic of the storage media when the storage media is sensed, read, or detected to determine what binary value(s) was last stored in the memory cell. Memory cell and storage cell are used interchangeably herein.

The storage device 102, also referred to herein as a storage device, may be a component within a host 110 as depicted in here, and may be connected using a data bus 124, such as a peripheral component interconnect express ("PCIe") bus, a Serial Advanced Technology Attachment ("serial ATA") bus, or the like. In another embodiment, the storage device 102 is external to the host 110 and is connected, a universal serial bus ("USB") connection, an Institute of Electrical and Electronics Engineers ("IEEE") 1394 bus ("FireWire"), or the like. In other embodiments, the storage device 102 is connected to the host 110 using a peripheral component interconnect ("PCI") express bus using external electrical or optical bus extension or bus networking solution such as InfiniBand or PCI Express Advanced Switching ("PCIe-AS"), or the like. "Host" refers to any computing device or computer device or computer system configured to send and receive storage commands. Examples of a host include, but are not limited to, a computer, a laptop, a mobile device, an appliance, a virtual machine, an enterprise server, a desktop, a tablet, a main frame, and the like.

In various embodiments, the storage device 102 may be in the form of a dual-inline memory module ("DIMM"), a daughter card, or a micro-module. In another embodiment, the storage device 102 is a component within a rack-mounted blade. In another embodiment, the storage device 102 is contained within a package that is integrated directly onto a higher-level assembly (e.g., mother board, laptop, graphics processor). In another embodiment, individual components comprising the storage device 102 are integrated directly onto a higher-level assembly without intermediate packaging.

In a further embodiment, instead of being connected directly to the host 110 as DAS, the data storage device 102 may be connected to the host 110 over a data network. For example, the data storage device 102 may include a storage area network ("SAN") storage device, a network attached storage ("NAS") device, a network share, or the like. In one embodiment, the storage system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host 110 and the data storage device 102.

The storage system 100 includes at least one host 110 connected to the storage device 102. Multiple hosts 110 may be used and may comprise a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a host 110 may be a client and the storage device 102 operates autonomously to service data requests sent from the host 110. In this embodiment, the host 110 and storage device 102 may be connected using a computer network, system bus, Direct Attached Storage (DAS) or other communication means suitable for connection between a computer and an autonomous storage device 102.

The depicted embodiment shows a user application 112 in communication with a storage client 114 as part of the host 110. In one embodiment, the user application 112 is a software application operating on or in conjunction with the storage client 114.

"Storage client" refers to any hardware, software, firmware, or logic component or module configured to communicate with a storage device in order to use storage services. Examples of a storage client include, but are not limited to, operating systems, file systems, database applications, a database management system ("DBMS"), server applications, a server, a volume manager, kernel-level processes, user-level processes, applications, mobile applications, threads, processes, and the like. "Hardware" refers to functional elements embodied as analog and/or digital circuitry. "Software" refers to logic implemented as processor-executable instructions in a machine memory (e.g., read/write volatile memory media or non-volatile memory media). "Firmware" refers to logic embodied as processor-executable instructions stored on volatile memory media and/or non-volatile memory media.

"Volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media. "Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory.

While the volatile memory media is referred to herein as "memory media," in various embodiments, the volatile memory media may more generally be referred to as volatile memory.

In certain embodiments, data stored in volatile memory media is addressable at a byte level which means that the data in the volatile memory media is organized into bytes (8 bits) of data that each have a unique address, such as a logical address.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

The storage client 114 manages files and data and utilizes the functions and features of the storage controller 104 and associated memory die 106. Representative examples of storage clients include, but are not limited to, a server, a file system, an operating system, a database management system ("DBMS"), a volume manager, and the like. The storage client 114 is in communication with the storage controller 104 within the storage device 102. In some embodiments, the storage client 114 may include remote storage clients operating on hosts 128 or otherwise accessible via the network 130. Storage clients may include, but are not limited to operating systems, file systems, database applications, server applications, kernel-level processes, user-level processes, applications, and the like.

The storage client 114 may present a logical address space 116 to the host 110 and/or user application 112. "Logical address space" refers to a logical representation of memory resources. The logical address space may comprise a plurality (e.g., range) of logical addresses. The logical address space 116 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

"Logical address" refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A logical address does not indicate the physical location of data on the storage media but is an abstract reference to the data.

"Logical block address" refers to a value used in a block storage device to associate each of n logical blocks available for user data storage across the storage media with an address. In certain block storage devices, the logical block addresses (LBAs) may range from 0 to n per volume or partition. In block storage devices, each LBA maps directly to a particular data block, and each data block maps to a particular set of physical sectors on the physical storage media.

A device driver for the host 110 (and/or the storage client 114) may maintain metadata 118 within the storage client 114, such as a logical to physical address mapping structure, to map logical addresses of the logical address space 116 to storage locations on the memory die 106. A device driver may be configured to provide storage services to one or more storage clients.

The storage client 114 may comprise the FLASH translation layer 120 and address mapping table 122. "FLASH translation layer" or "logical address to physical address (L2P) translation" refers to logic in a FLASH memory device that includes logical-to-physical address translation providing abstraction of the logical block addresses used by the storage client and the physical block addresses at which the storage controller stores data. The logical-to-physical translation layer maps logical block addresses (LBAs) to physical addresses of data stored on non-volatile storage media. This mapping allows data to be referenced in a logical block address space using logical identifiers, such as a block address. A logical identifier does not indicate the physical location of data on the solid-state storage media but is an abstract reference to the data.

The FLASH translation layer 120 receives the processed data as well as one or more control signals to determine the FLASH translation layer queue depth. The FLASH translation layer 120 may interact via control signals with the address mapping table 122 to determine an appropriate physical address to send data and commands to the memory die 106 and the volatile memory. In one embodiment, the FLASH translation layer 120 also receives the data outputs from the memory die 106.

"Address mapping table" refers to a data structure that associates logical block addresses with physical addresses of data stored on a non-volatile memory array. The table may be implemented as an index, a map, a b-tree, a content addressable memory (CAM), a binary tree, and/or a hash table, and the like. The address mapping table 122 stores address locations for data blocks on the storage device 102 to be utilized by the FLASH translation layer 120. Specifically, the FLASH translation layer 120 searches the address mapping table 122 to determine if a logical block address included in the storage command, has an entry in the address mapping table 122. If so, the physical address associated with the logical block address is used to direct the storage operation on the memory die 106.

"Data block" refers to a smallest physical amount of storage space on physical storage media that is accessible, and/or addressable, using a storage command. The physical storage media may be volatile memory media, non-volatile memory media, persistent storage, non-volatile storage, flash storage media, hard disk drive, or the like. Certain conventional storage devices divide the physical storage media into volumes or logical partitions (also referred to as partitions). Each volume or logical partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or similar operating systems, the data blocks are referred to simply as blocks. A data block or cluster represents a smallest physical amount of storage space on the storage media that is managed by a storage controller. A block storage device may associate n data blocks available for user data storage across the physical storage media with a logical block address (LBA), numbered from 0 to n. In certain block storage devices, the logical block addresses may range from 0 to n per volume or logical partition. In conventional block storage devices, a logical block address maps directly to one and only one data block.

"Storage operation" refers to an operation performed on a memory cell in order to change, or obtain, the value of data represented by a state characteristic of the memory cell. Examples of storage operations include but are not limited to reading data from (or sensing a state of) a memory cell, writing (or programming) data to a memory cell, and/or erasing data stored in a memory cell.

"Characteristic" refers to any property, trait, quality, or attribute of an object or thing. Examples of characteristics include, but are not limited to, condition, readiness for use, unreadiness for use, chemical composition, water content, temperature, relative humidity, particulate count, a data value, contaminant count, and the like.

In one embodiment, the storage system 100 includes one or more clients connected to one or more hosts 128 through one or more computer networks 130. A host 128 may be a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The network 130 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The network 130 may also include a network from the IEEE 802 family of network technologies, such Ethernet, token ring, WiFi, WiMax, and the like.

The network 130 may include servers, switches, routers, cabling, radios, and other equipment used to facilitate networking the host 110 or hosts and host 128 or clients. In one embodiment, the storage system 100 includes multiple hosts that communicate as peers over a network 130. In another embodiment, the storage system 100 includes multiple memory devices 102 that communicate as peers over a network 130. One of skill in the art will recognize other computer networks comprising one or more computer networks and related equipment with single or redundant connection between one or more clients or other computer with one or more memory devices 102 or one or more memory devices 102 connected to one or more hosts. In one embodiment, the storage system 100 includes two or more memory devices 102 connected through the network 130 to a host 128 without a host 110.

In one embodiment, the storage client 114 communicates with the storage controller 104 through a host interface comprising an Input/Output (I/O) interface. For example, the storage device 102 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In one example embodiment, a data block includes eight sectors which is 4 KB. In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or data block or cluster represents a smallest physical amount of storage space on the storage media that is managed by a storage manager, such as a storage controller, storage system, storage unit, storage device, or the like.

In some embodiments, the storage controller 104 may be configured to store data on one or more asymmetric, write-once storage media, such as solid-state storage memory cells within the memory die 106. As used herein, a "write once" storage media refers to storage media that is reinitialized (e.g., erased) each time new data is written or programmed thereon. As used herein, an "asymmetric" storage media refers to a storage media having different latencies for different storage operations. Many types of solid-state storage media (e.g., memory die) are asymmetric; for example, a read operation may be much faster than a write/program operation, and a write/program operation may be much faster than an erase operation (e.g., reading the storage media may be hundreds of times faster than erasing, and tens of times faster than programming the storage media).

The memory die 106 may be partitioned into memory divisions that can be erased as a group (e.g., erase blocks) in order to, inter alia, account for the asymmetric properties of the memory die 106 or the like. "Erase block" refers to a logical erase block or a physical erase block. In one embodiment, a physical erase block represents the smallest storage unit within a given memory die that can be erased at a given time (e.g., due to the wiring of storage cells on the memory die). In one embodiment, logical erase blocks represent the smallest storage unit, or storage block, erasable by a storage controller in response to receiving an erase command. In such an embodiment, when the storage controller receives an erase command specifying a particular logical erase block, the storage controller may erase each physical erase block within the logical erase block simultaneously. It is noted that physical erase blocks within a given logical erase block may be considered as contiguous within a physical address space even though they reside in separate dies. Thus, the term "contiguous" may be applicable not only to data stored within the same physical medium, but also to data stored within separate media.

As such, modifying a single data segment in-place may require erasing the entire erase block comprising the data, and rewriting the modified data to the erase block, along with the original, unchanged data. This may result in inefficient write amplification, which may excessively wear the memory die 106. "Write amplification" refers to a measure of write/programming operations performed on a non-volatile storage device which result in writing any data, and user data in particular, more times than initially writing the data in a first instance. in certain embodiments, write amplification may count the number of write operations performed by a non-volatile storage device in order to manage and maintain the data stored on the non-volatile storage device. in other embodiments, write amplification measures the amount of data, the number of bits, written that are written beyond an initial storing of data on the non-volatile storage device.

Therefore, in some embodiments, the storage controller 104 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

Management of a data block by a storage manager includes specifically addressing a particular data block for a read operation, write operation, or maintenance operation. A block storage device may associate n blocks available for user data storage across the storage media with a logical address, numbered from 0 to n. In certain block storage devices, the logical addresses may range from 0 to n per volume or partition.

In conventional block storage devices, a logical address maps directly to a particular data block on physical storage media. In conventional block storage devices, each data block maps to a particular set of physical sectors on the physical storage media. However, certain storage devices do not directly or necessarily associate logical addresses with particular physical data blocks. These storage devices may emulate a conventional block storage interface to maintain compatibility with a block storage client 114.

In one embodiment, the storage controller 104 provides a block I/O emulation layer, which serves as a block device interface, or API. In this embodiment, the storage client 114 communicates with the storage device through this block device interface. In one embodiment, the block I/O emulation layer receives commands and logical addresses from the storage client 114 in accordance with this block device interface. As a result, the block I/O emulation layer provides the storage device compatibility with a block storage client 114.

In one embodiment, a storage client 114 communicates with the storage controller 104 through a host interface comprising a direct interface. In this embodiment, the storage device directly exchanges information specific to non-volatile storage devices. "Non-volatile storage device" refers to any hardware, device, component, element, or circuit configured to maintain an alterable physical characteristic used to represent a binary value of zero or one after a primary power source is removed. Examples of a non-volatile storage device include, but are not limited to, a hard disk drive (HDD), Solid-State Drive (SSD), non-volatile memory media, and the like.

A storage device using direct interface may store data in the memory die 106 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die 106.

The storage controller 104 receives a logical address and a command from the storage client 114 and performs the corresponding operation in relation to the memory die 106. The storage controller 104 may support block I/O emulation, a direct interface, or both.

Figure 2:
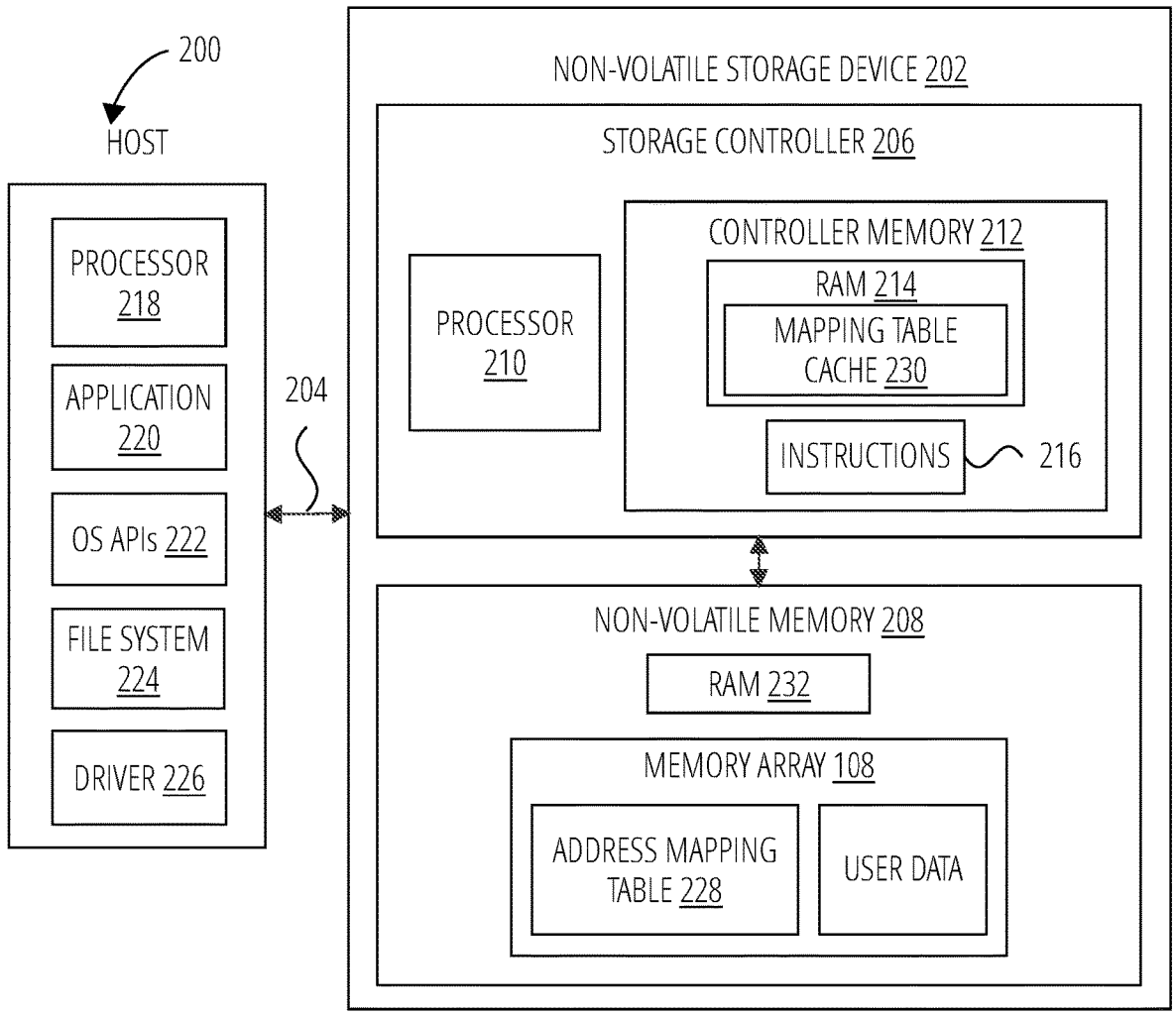
FIG. 2 illustrates a block diagram of a host and a storage device according to one embodiment.

A non-volatile memory system suitable for use in implementing certain embodiments is shown in FIG. 2. A host system 200 stores data into, and retrieves data from, a non-volatile storage device 202. The non-volatile storage device 202 may be embedded in the host system 200 or may exist in the form of a card or other removable drive, such as a solid-state disk (SSD) that is removably connected to the host system 200 through a mechanical and electrical connector. The host system 200 may be any of a number of fixed or portable data generating devices, such as a personal computer, a mobile telephone, a personal digital assistant (PDA), or the like. The host system 200 communicates with the storage device over a communication channel 204.

The non-volatile storage device 202 contains a storage controller 206 and a non-volatile memory 208. As shown in FIG. 2, the storage controller 206 includes a processor 210 and a controller memory 212. The processor 210 may comprise a microprocessor, a microcontroller, an application specific integrated circuit (ASIC), a field programmable gate array, a logical digital circuit, or other now known or later developed logical processing capability. The controller memory 212 may include volatile memory such as random-access memory (RAM 214) and/or non-volatile memory, and processor executable instructions 216 for handling memory management. The RAM 214 may include one or more of any of a number of types of RAM, such as static RAM (SRAM) or dynamic RAM (DRAM).

As discussed in more detail below, the non-volatile storage device 202 may include functions for memory management. In operation, the processor 210 may execute memory management instructions (which may be resident in instructions 216) for operation of memory management functions. The memory management functions may control the assignment of the one or more portions of the non-volatile memory 208 within the non-volatile storage device 202.

The non-volatile memory 208 may include non-volatile memory media (such as FLASH memory). One or more memory types may be included in non-volatile memory 208. The memory may include memory array 108. In embodiments where the non-volatile memory 208 includes FLASH memory as non-volatile memory, the memory array 108 may be made up of the same type of FLASH memory cell or different types of FLASH memory cells. For example, the memory array 108 may consist of both single-level cell (SLC) type FLASH and a multi-level cell (MLC) type FLASH memory having two or more bit per cell capacity to take advantage of the higher write speed of SLC flash and the higher density of MLC flash. Different combinations of FLASH memory types are also contemplated for the memory array 108. Additionally, the non-volatile memory 208 may also include volatile memory such as any of a number of forms of random-access memory (RAM 232).

The memory array 108 of non-volatile memory 208 may include physical blocks of FLASH memory that each consists of a group of pages, where a physical block of FLASH memory (also referred to as erase blocks) is a group of pages and a page is a smallest unit of writing in the memory. The physical blocks in the memory include operative blocks that are represented as logical blocks to a storage client such as the file system 224. The non-volatile storage device 202 may be in the form of a portable flash drive, an integrated solid-state drive or any of a number of known flash drive formats. In yet other embodiments, the non-volatile storage device 202 may include only a single type of FLASH memory having one or more partitions.

Referring again to FIG. 2, the host system 200 may include a processor 218 that runs one or more application programs 220. The application programs 220, when data is to be stored on or retrieved from the non-volatile storage device 202, communicate through one or more operating system application programming interfaces (APIs) 222 with the file system 224. The file system 224 may be a software module executed on the processor 218 and manages the files in the non-volatile storage device 202. The file system 224 manages clusters of data in logical address space. The file system 224 may be circuitry, software, or a combination of circuitry and software. Accordingly, the file system 224 may be a stand-alone chip or software executable by the processor of the host system 200. A storage device driver 226 on the host system 200 translates instructions from the file system 224 for transmission over a communication channel 204 between the host system 200 and non-volatile storage device 202. The interface for communicating over the communication channel 204 may be any of a number of known interfaces, such as SD, MMC, USB storage device, SATA and SCSI interfaces. The host system 200 utilizes the file system data structure to maintain a logical address range for all logical block addresses (LBAs) that have been assigned by the host system 200 to data.

In addition to the user data and host-generated file system data structures that may be stored in FLASH memory on the non-volatile storage device 202, the storage device itself stores and maintains an address mapping table 228, a logical-to-physical mapping table, or other data structure that tracks the logical addresses supplied by the host file system and the physical addresses where the storage device is keeping the data. A primary logical-to-physical mapping table, sometimes referred to as an address mapping table 228 may be stored in the memory array 108. A copy of a portion of the address mapping table 228 may be cached in RAM 214 in the non-volatile storage device 202 as a mapping table cache 230 for faster access to the logical-to-physical mapping information. "Mapping table cache" refers to a data structure configured to associate an LBA and/or an LBA range with a physical block address and/or a physical block address range.

Within the non-volatile storage device 202, the storage controller 206 may act as the processor of the disclosed apparatus. The controller memory 212 may store instructions 216 that, when executed by the storage controller 206, configure the apparatus to receive a first logical address associated with a first read command, wherein a first segment of a mapping table cache 230 comprises the first logical address. The non-volatile storage device 202 may further receive a second logical address associated with a second read command, wherein a second segment of an address mapping table 228 comprises the second logical address. The storage controller 206 may increase a correlation metric that correlates the first segment to the second segment in response to the mapping table cache 230 failing to include the second segment and in response to receiving the first logical address before the second logical address. The storage controller 206 may thus manage the mapping table cache 230 based on the correlation metric.

Figure 3:
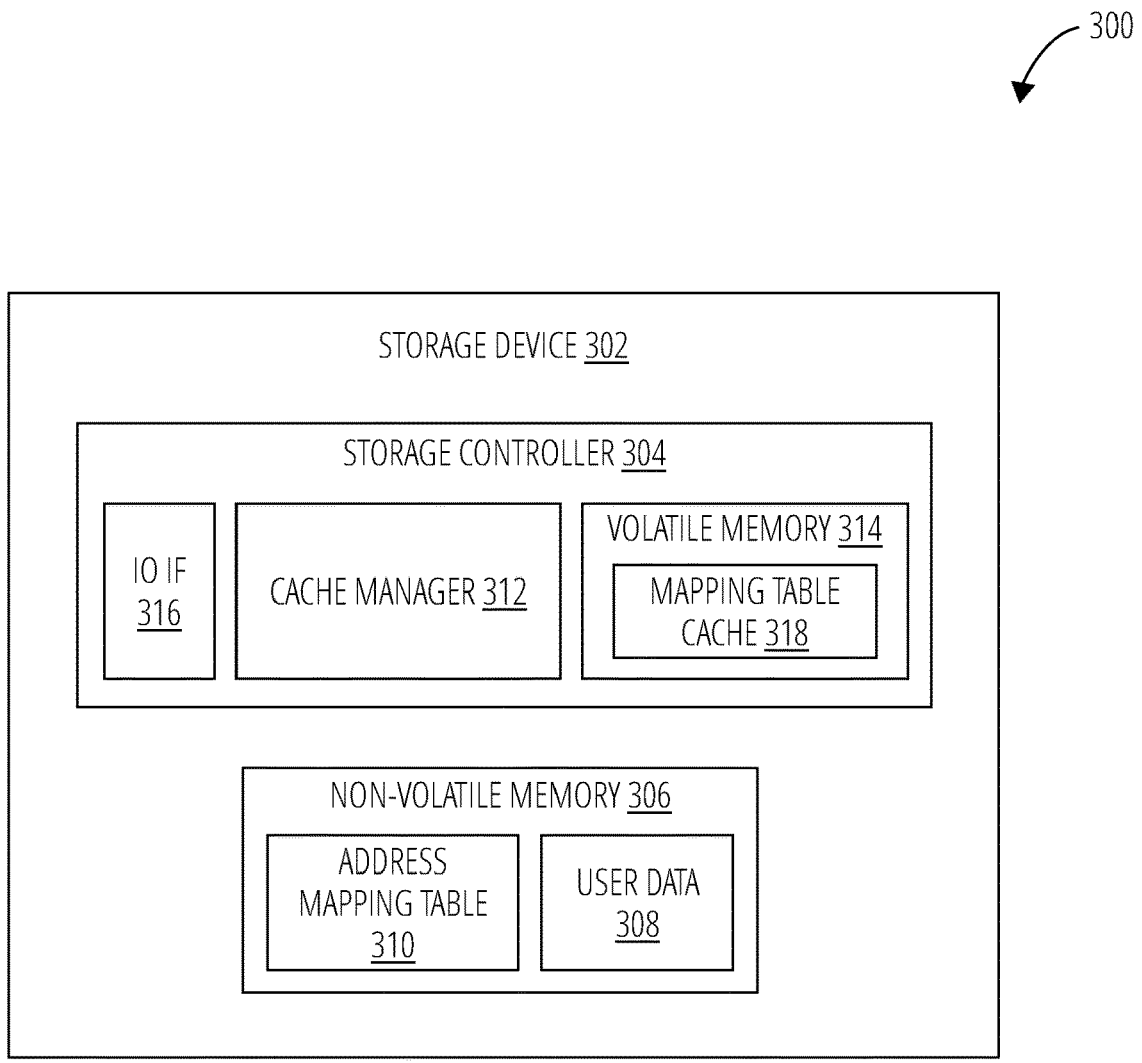
FIG. 3 illustrates a storage system 300 in accordance with one embodiment.

FIG. 3 illustrates a storage device 302 as part of a storage system 300 configured to implement a cache management policy in accordance with the claimed solution. "Cache management policy" refers to a set of methods, rules, and requirements that are used to how many cache entries to have, how large to make cache entries, when to load cache entries, how many cache entries to load, when and how to evict cache entries, and the like. In the embodiments, disclosed herein a segment comprises a cache entry. The storage device 302 includes a storage controller 304 and non-volatile memory 306. The non-volatile memory 306 includes user data 308 and at least one full copy of an address mapping table 310. In certain embodiments, the storage controller 304 may maintain duplicate copies of the address mapping table 310 to protect against possible corruption of data in the address mapping table 310. In certain embodiments, the address mapping table 310 may also be referred to as a group allocation table (GAT table).

The storage controller 304 includes a cache manager 312, volatile memory 314, and an input/output interface 316. The input/output interface 316 receives a storage command from the host and returns data and/or a response to the host for each command. The storage controller 304 services storage commands (e.g., read commands, write commands, storage device 302 maintenance operations) using a physical address provided by the cache manager 312. The volatile memory 314 is typically limited in size and stores a mapping table cache 318.

"Storage command" refers to any command that a storage controller services including commands issued by a storage device or host external to the storage controller as well as any commands issued by components or modules internal to the storage controller. Examples of storage commands include, but are not limited to, read commands, write commands, status commands, test mode commands, garbage collection (data relocation commands), read scrub (refreshing of data values stored in memory cells) commands, and the like. The mapping table cache 318 holds a portion of the data (e.g., a copy of the data organized into cache entries such as segments) stored in the address mapping table 310.

The cache manager 312 handles loading, unloading, and replacing of segments within the mapping table cache 318. Unloading a segment or replacing a segment is referred to as eviction. The cache manager 312 may use certain criteria to determine which segments to evict. The cache manager 312 may use an eviction threshold based on one or more correlation metrics satisfying an eviction threshold. If LBAs of a segment have a correlation metric that satisfies the eviction threshold, the segment is evicted from the mapping table cache. "Threshold" refers to a setting above which, or below which, a condition is met or an associated event will occur. "Eviction threshold" refers to a threshold value for a correlation metric defined such that when a correlation metric is at, or below, the eviction threshold, the correlation metric satisfies the eviction threshold. In one embodiment, a correlation metric is increased the more times a first LBA is requested followed by a particular second LBA. In another embodiment, the correlation metric may only be increased if the first LBA is requested by the second LBA within a particular time window.

The storage controller 304 additionally includes volatile memory 314, configured to store a mapping table cache 318 comprising a set of segments. An input/output interface 316 configured to receive a read command comprising a logical address that uniquely identifies a set of data blocks stored on the non-volatile memory. The storage device 302, in one embodiment, may also include non-volatile memory 306 comprised of an address mapping table 310 and user data 308.

Figure 4:
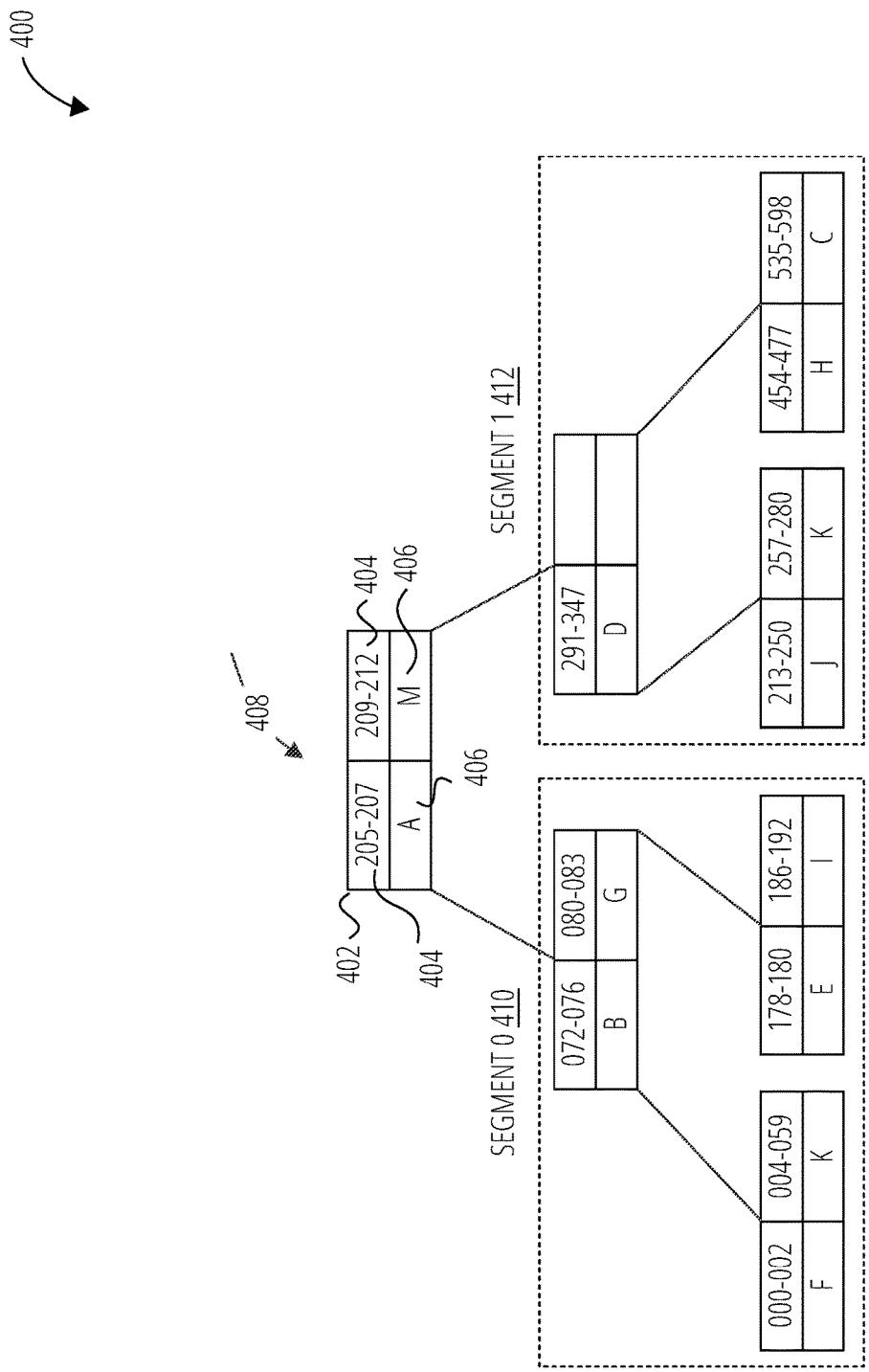
FIG. 4 illustrates an address mapping table 400 in accordance with one embodiment.

FIG. 4 depicts one embodiment of an address mapping table 400. The address mapping table 400, in one embodiment, may be maintained by the cache manager 312 of the storage controller 304 to map LBAs or other logical addresses to physical locations on the non-volatile memory 306. The address mapping table 400, in the depicted embodiment, is a B-tree with several entries. In the depicted embodiment, the nodes of the address mapping table 400 include direct references to physical locations in the non-volatile memory 306. This is shown, for example, in node 402, which has two entries, each entry including an LBA range 404 and a physical block address 406, indicated by an alphabetic designation (i.e., "A" and "M").

In the illustrated embodiment, the LBA range 404 (i.e., "202" through "207") may correspond to a set of logical block addresses identified by sequential whole numbers from "202" through "207." Each of segment 0 410 and segment 1 412 comprises one or more nodes 402 and thus also include at least one LBA range 404 representing a portion of the address mapping table 400 stored on non-volatile memory 306.

In other embodiments, the address mapping table 400 may include links that map to entries in a reverse map, or the like. The address mapping table 400, in various embodiments, may be used either with, or without a reverse map. In other embodiments, the references in the address mapping table 400 may include alpha-numerical characters, hexadecimal characters, pointers, links, and the like.

The address mapping table 400, in the depicted embodiment, includes a plurality of nodes. Each node, in the depicted embodiment, is capable of storing two entries. In other embodiments, each node may be capable of storing a greater number of entries, the number of entries at each level may change as the address mapping table 400 grows or shrinks through use, or the like.

Each entry, in the depicted embodiment, maps a variable length range of LBAs to a physical location in the non-volatile memory 306. Further, while variable length ranges of LBAs, in the depicted embodiment, are represented by a starting address and an ending address, in other embodiments, a variable length range of LBAs may be represented by a starting address and a length, or the like. In another embodiment, instead of storing variable length ranges of LBAs, the address mapping table 400 may store a single LBA or other logical address in an entry as a starting address for a data value and/or for associated metadata.

In the illustrated example, the address mapping table 400 is represented by a tree data structure, a similar tree data structure may be maintained within the cache manager 312 and/or on the non-volatile memory 306. In the tree structure, nodes 402 on the left-hand side may include all LBAs, less than the starting address of the root node 408. For example, the starting LBA in this example is 205 in the range 205-207. Root node 408 also includes an LBA range 209-212. As illustrated each node in the left-hand sub-tree has an LBA value less than 205 and each node in the right-hand sub-tree has an LBA value greater than 212.

A node 402 may store one or more LBA ranges 404. For example, each entry of a node 402 may comprise an LBA range 404 and a physical block address 406 as shown. A cache manager 312 may divide the address mapping table 400 divided into segments, such as segment 0 410 and segment 1 412. Each segment may comprise one or more LBA ranges that together represent a portion of an address mapping table 400 stored on non-volatile storage media.

In one embodiment, the capital letters 'A' through 'M' may represent a logical or physical erase block in the non-volatile memory 306 that stores the data of the corresponding range of LBAs. "Physical erase block" refers to smallest storage unit within a given memory die that can be erased at a given time (e.g., due to the wiring of storage cells on the memory die). In other embodiments, the capital letters may represent other physical addresses or locations of the non-volatile memory 306.

In the depicted embodiment, membership in the address mapping table 400 denotes membership (or storage) in the non-volatile memory 306. In another embodiment, an entry may further include an indicator of whether the non-volatile memory 306 stores data corresponding to a logical block within the range of LBAs, data of a reverse map, and/or other data.

Figure 5:
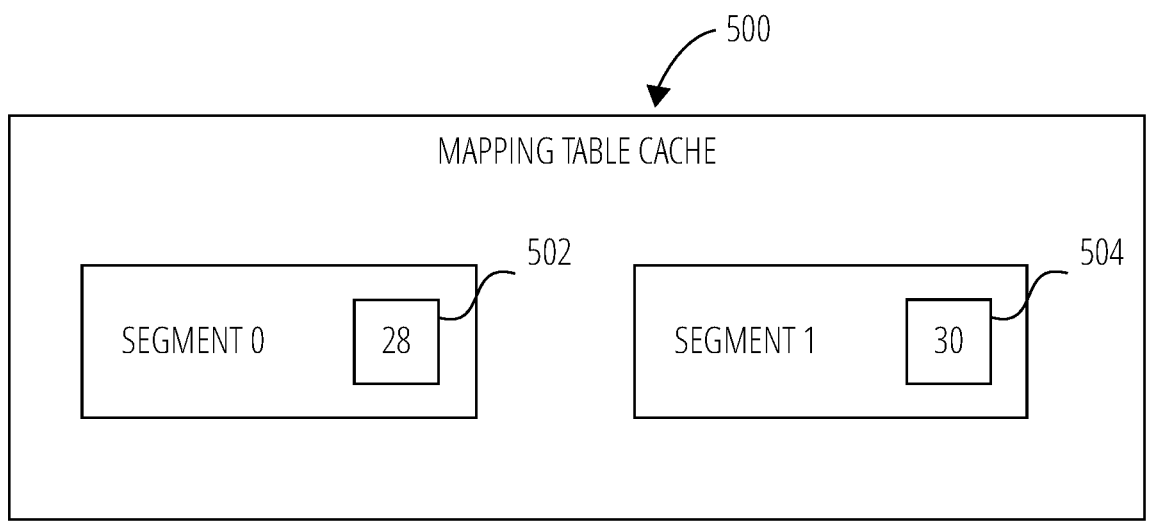
FIG. 5 illustrates a mapping table cache 500 in accordance with one embodiment.

FIG. 5 illustrates a mapping table cache 500 in accordance with one embodiment. The mapping table cache 500 may be populated with at least two segments, such as the segment 0 410 and segment 1 412 illustrated in FIG. 4. Each segment may comprise at least one logical address, such as an LBA or LBA range and a corresponding physical address for data blocks stored on non-volatile storage media. In one embodiment, a segment comprises one or more nodes 402. The cache manager 312 may use the mapping table cache 500 to track a hit rate for segments within the mapping table cache 500. In one embodiment, the hit rate is a numeric value that is incremented each time an LBA is requested as part of a storage operation and the mapping between the LBA and the physical address is found in a segment. FIG. 5 illustrates segment 0 hit rate 502 and segment 1 hit rate 504.

In certain embodiments, a cache manager 312 may load a segment into the mapping table cache 500 before a request for LBAs referenced in the segment are requested by a host or received by the cache manager 312. This process of loading a segment before a request for LBAs of the segment is received is referred to as prefetching. In one embodiment, a cache manager 312 may prefetch a segment into the mapping table cache 500 based on a correlation metric satisfying a prefetch threshold. "Prefetch threshold" refers to a threshold value for a correlation metric defined such that when a correlation metric is at, or above, the prefetch threshold, the correlation metric satisfies the prefetch threshold.

In addition, or alternatively, cache manager 312 may evict a segment from the mapping table cache 500 in response to a logical address, such as an LBA range, having a correlation metric that satisfies an eviction threshold. Correlation metrics are associated with pairs of logical addresses, such as LBA ranges. In certain embodiments, the cache manager 312 may be configured to evict a segment from the mapping table cache 500 if the correlation metric falls below an eviction threshold. In such an embodiment, a correlation metric for a pair of LBA ranges that is below the eviction threshold may mean that a correlation between a first LBA range being requested followed by a second LBA range being requested is low or weak. Consequently, when a correlation metric for a pair of LBA ranges falls below the eviction threshold the cache manager 312 may evict a segment that includes the first LBA range of the pair of LBA ranges.

For example, suppose a correlation metric is a whole number and the eviction threshold is a whole number, such as 10. When the correlation metric for an LBA range of a segment in the mapping table cache is less than 10, the cache manager 312 evicts that segment.

Additionally, a cache manager 312 may use correlation metrics for LBA ranges of a segment to perform other operations. For example, high correlation metric values may represent a strong correlation or high correlation. Accordingly, the cache manager 312 may configure or adjust storage controller management tables based on one or more correlation metrics for segments in a mapping table cache.

In one embodiment, a cache manager 312 may change how segments are organized and which LBAs are included in a segment based on the correlation metrics. For example, a correlation metric represents how likely a second LBA range will be requested after a first LBA range. If the first LBA range is included in a segment that is in a mapping table cache and a second LBA range is included in a second segment that is not in the mapping table cache, the cache manager 312 may determine that the LBA ranges in each of the two segments should be combined.

Candidate segments for making such a combination may be LBA ranges having a correlation metric that is above a certain threshold. For example, if LBA range A is in segment 0 410 and LBA range B is neither in segment 0 410 or segment 1 412, but is instead in in segment 4 (not shown) and stored in address mapping table 310 and LBA range A has a correlation metric of 0.8 on a 0 to 1 scale, then cache manager 312 may combine segment 0 410 and segment 4 into a new segment and store the new segment in the mapping table cache 500.

In another embodiment, a cache manager 312 may change a size of a segment such that it includes more or fewer LBA ranges. For example, if all, but one, the LBA ranges of a segment include a correlation metric greater than 0.5 on a 0 to 1 scale, the cache manager 312 may reduce the size of all segments and remove the LBA range in a given segment with a correlation metric less than 0.5, such that the segment includes only LBA ranges having a correlation metric greater than 0.5. Conversely, the cache manager 312 may increase the size of segments such that segments having LBA ranges with higher correlation metrics are stored in the mapping table cache 500.

In one embodiment, instructions may configure a storage device to populate the mapping table cache 500 with at least two segments, such as the segment 0 and segment 1 shown.

Each segment may comprise one or more logical addresses, e.g., LBA or LBA range, corresponding with one or more physical addresses for data blocks stored within non-volatile storage media. The mapping table cache 500 may further be used to track a hit rate for each segment in the mapping table cache 500, such as the segment 0 hit rate 502 and segment 1 hit rate 504 shown.

FIG. 6 illustrates an LBA correlation table 600 in accordance with one embodiment. "LBA correlation table" refers to a data structure configured to track, record, or monitor a relationship between a first LBA or LBA range and a second LBA or LBA range and a correlation metric indicative of the strength or weight of the relationship between the two LBAs or LBA ranges. Those of skill in the art will recognize that an LBA correlation table need not be implemented exclusively as a table structure and may comprise a variety of data structures, including an array, lists, a database, a file, a set of registers, a table structure comprising rows and columns, and the like.

The columns of the LBA correlation table 600 may comprise a Last LBA accessed 602, a current LBA accessed 604, and a correlation metric 606. The last LBA accessed 602 may be an LBA or LBA range that was last accessed or received for servicing or was requested by a host. The current LBA accessed 604 may be an LBA or LBA range that is currently being accessed or serviced or requested by a host. A cache manager 312 use the LBA correlation table 600 to track how often an access of one LBA, or LBA range, such as LBA range "A", is followed by an access of a specific other LBA, such as LBA range "B". The LBA correlation table 600 may also track, a reverse order of request, how often an access of LBA range "B" is followed by accessing LBA range "A", and so on. The correlation metric 606, in one embodiment, represents numerically the correlation of "A" accesses followed by "B" accesses, etc., and may be incremented and decremented as described with regard to FIG. 7 below.

Each row of the LBA correlation table 600 stores a correlation metric for a pair of LBAs (last LBA accessed 602 and 604). In the example LBA correlation table 600, an LBA "A" followed by LBA "B" pair, an LBA "B" followed by LBA "A" pair, and an LBA "D" followed by LBA "E" pair are illustrated. When a correlation metric for a particular row is being referenced, the other rows of the LBA correlation table 600 each include a last LBA accessed 602 and a current LBA accessed 604 which together are a pair of other logical addresses besides the pair for the row in which the correlation metric is being referenced.

As in the illustrated embodiment, the correlation metric 606 may be a decimal value between 0 and 1, where a value of 0 represents no correlation and a value of 1 represents complete correlation. That is, an LBA pair such as "A" and "B" in the figure, having a correlation metric 606 of 1, may indicate that every access of LBA "A" is followed by an access of LBA "B". The correlation metric 606 value of 0.10 for an access of LBA "D" followed by an access of LBA "E" may indicate that only 10% of accesses to LBA "D" are followed by accesses of LBA "E."

In other embodiments, the correlation metric may be calculated using a different scale, and some correlation metric values may be negative as well as positive. The illustrated embodiment is only one example, and not intended as a limitation of the disclosed solution.

In one embodiment, a cache manager 312 uses the LBA correlation table 600 to define, organize, and manage segments within a mapping table cache 318. For example, the cache manager 312 may organize the segments such that more LBA range having higher correlation metric are grouped into the same segments. In this manner, a cache manager 312 may use a correlation metric to associate segments within the mapping table cache 318, while the correlation metrics directly relate one LBA range (last LBA accessed 602) to another (current LBA accessed 604). For example, the cache manager 312 may organize segments based on commonalities among the values of the correlation metrics.

Figure 7:
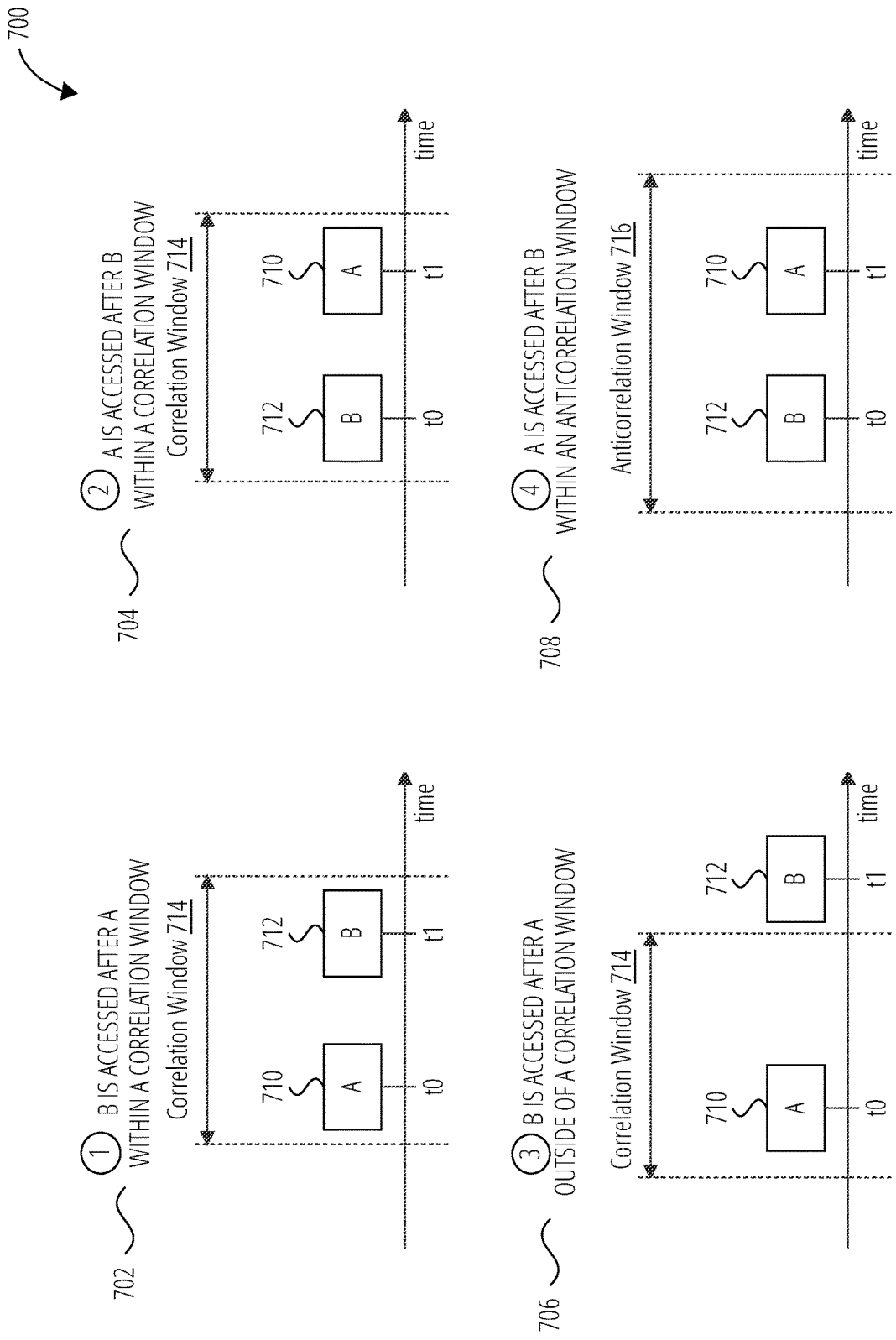
FIG. 7 illustrates logical address request tracking or read command tracking 700 in accordance with one embodiment.

FIG. 7 illustrates read command tracking 700 in accordance with one embodiment. The read command tracking 700 illustrated includes four different cases: a case 1, where B is accessed after A within a correlation window 714, a case 2, where A is accessed after B within a correlation window 714, a case 3, where B is accessed after A outside of a correlation window 714, and a case 4, where A is accessed after B within an anticorrelation window 716.

Where B is accessed after A within a correlation window 714, a first logical address "A" associated with a first read command and a first segment of an address mapping table, may be accessed at time t0, as illustrated by LBA A access 710. "Correlation window" refers to a span of time that includes receipt of a first logical address X, such as a single logical block address (LBA), LBA range, or receipt of a storage command that references a first logical address X followed by receipt of a second logical address Y, such as a single LBA, LBA range, or receipt of another storage command that references the second logical address Y such that receipt of the first logical address X followed by receipt of the second logical address Y, in that order, represents an ordered relationship between X and Y with a likelihood of being repeated in the future. A correlation window may be measured in any unit of time, including nanoseconds, microseconds, seconds, minutes, hours, days, weeks, or the like. A correlation window is a span of time configured such that two logical addresses received, identified, or requested, in time order, during the correlation window is indicative of an association or correlation in the order of the requests for the two logical addresses. In particular, the order of receipt of the two logical addresses may be relied upon to predict a likelihood that the same two logical addresses will be received, requested, or identified, in that same order, in the future.

At a later time t1, a second logical address "B" associated with a second read command and a second segment of the address mapping table may be received as LBA B access 712. When LBA A access 710 occurs before LBA B access 712, a correlation metric associating the first segment to the second segment may be increased. The first logical address and second logical address may each map to a physical address within the address mapping table, and a mapping table cache may be configured to store two or more segments, where the mapping table cache is managed based on the correlation metric. In one embodiment, an increment weighting factor may be applied to the correlation metric, such that the correlation metric increases in response to LBA B access 712 occurring within a correlation window 714 spanning both LBA A access 710 and LBA B access 712. This is described by Equation 1 below:

$$W(A \text{ to } B) : W(A \text{ to } B) + \Delta \qquad \text{Equation 1}$$

where W(A to B) is the correlation metric for LBA A access 710 occurring directly before LBA B access 712, and Δ is the increment weighting factor. "Factor" refers to a quantity, variable, or formula defined such that application of the factor to a value, or relationship represented by a value, either increases or decreases the value. In one embodiment, the value combined with a factor is a correlation metric.

A factor may also be referred to as a weight or weighting factor because its application/combination with a value increases or decreases the magnitude of the value. Where the value represents a relationship, this increase or decrease is analogous to increasing or decreasing the strength, connection, association of the relationship between two things. "Increment weighting factor" refers to a factor that increases the magnitude of a correlation metric.

Where A is accessed after B within a correlation window 714, in some embodiments, the correlation metric may be decreased in response to LBA A access 710 occurring at t1 subsequent to LBA B access 712 at t0. Decreasing the correlation metric may comprise applying a reduction weighting factor as described by Equation 2 below:

$$W(A \text{ to } B):W(A \text{ to } B)-\Delta/10 \qquad \text{Equation 2}$$

where W(A to B) is the correlation metric for LBA A access 710 occurring directly before LBA B access 712, and Δ/10 is the reduction weighting factor. "Reduction weighting factor" refers to a factor that reduces the magnitude of a correlation metric. Note that W(A to B) may be decreased in this manner, even as W(B to A), or the correlation metric for LBA B access 712 occurring before LBA A access 710, is increased as illustrated in B is accessed after A within a correlation window 714 for W(A to B). In some embodiments, the correlation metric may be decreased in response to the mapping table cache failing to include the first segment and in response to LBA B access 712 occurring before LBA A access 710. Note also that the reduction weighting factor may incorporate a tuning parameter. "Tuning parameter" refers to a configurable parameter that includes a weighting parameter, the size for segments, the size for the mapping table cache, the size for the sliding lookback window, and the like.

Where B is accessed after A outside of a correlation window 714, a zero weighting factor may be applied to the correlation metric, such that the correlation metric is unchanged in response to the LBA B access 712 at t1 falling outside of the correlation window 714, measured from receipt of the LBA A access 710 at t0. "Zero weighting factor" refers to a factor that results in no change to the magnitude of a correlation metric once applied to the correlation metric. The application of such a zero weighting factor may be as represented in Equation 3 below:

$$W(A \text{ to } B):W(A \text{ to } B)+0 \qquad \text{Equation 3}$$

Where A is accessed after B within an anticorrelation window 716, in some embodiments, the correlation metric may be decreased by application of a reduction weighting factor, as shown in Equation 2, in response to receiving LBA B access 712 at t0 before LBA A access 710 at t1 within an anticorrelation window 716 that spans receipt of the LBA B access 712 and LBA A access 710. The correlation window 714 previously described may be smaller than the anticorrelation window 716 of this case. "Anticorrelation window" refers to a type of correlation window that that represents an opposite order relationship for two logical addresses as in relation to an ordered for the two logical addresses within a correlation window. In particular, an anticorrelation window refers to a span of time that includes receipt of a first logical address Y, such as a single logical block address (LBA), LBA range, or receipt of a storage command that references a first logical address Y followed by receipt of a second logical address X, such as a single LBA, LBA range, or receipt of another storage command that references the second logical address X such that receipt of the first logical address Y followed by receipt of the second logical address X, in that order, represents a decreased or weakened order relationship between logical address X and logical address Y, in that order (X and then Y), having a likelihood of being repeated in the future. An anticorrelation window may be measured in any unit of time, including nanoseconds, microseconds, seconds, minutes, hours, days, weeks, or the like. An anticorrelation window is a span of time configured such that two logical addresses received, identified, or requested, in time order, during the anticorrelation window is indicative of a decreased or weakened association or correlation for the opposite ordering of the receipt or the requests for the two logical addresses. In particular, the order of receipt of the two logical addresses within an anticorrelation window may be relied upon to reduce a likelihood prediction that the same two logical addresses will be received, requested, or identified, in the opposite same order, in the future.

Figure 8:
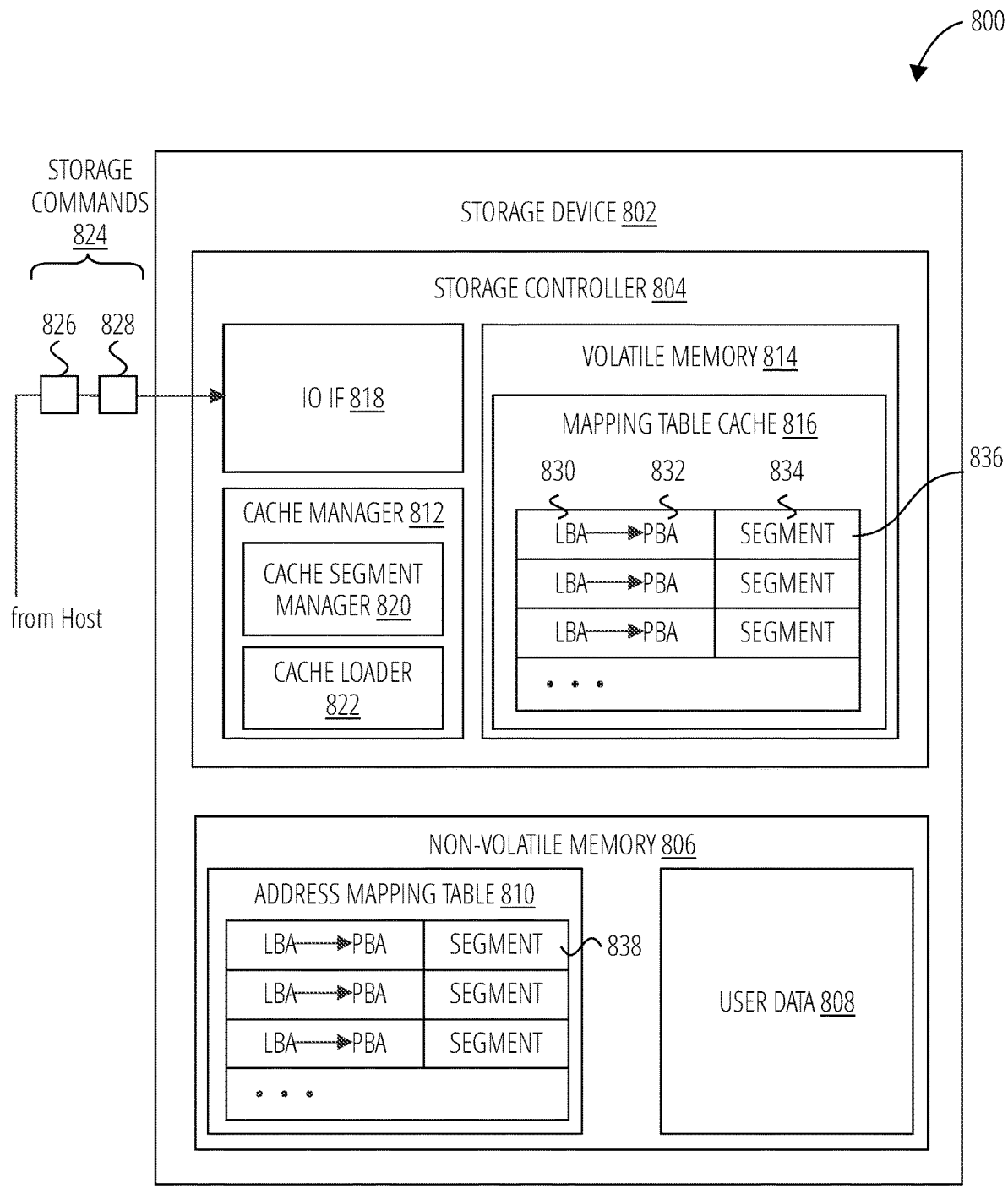
FIG. 8 is a block diagram of a storage system 800 in accordance with one embodiment.

FIG. 8 illustrates a storage device 802 as part of a storage system 800 configured to manage a mapping table cache 816 in accordance with the claimed solution. The storage device 802 includes a storage controller 804 and non-volatile memory 806. The non-volatile memory 806 includes stored user data 808 and at least one full copy of an address mapping table 810. In certain embodiments, the address mapping table 810 may also be referred to as a group allocation table (GAT table). The storage controller 804 additionally includes volatile memory 814, configured to store a mapping table cache 816 comprising a set of segments.

The storage controller 804 includes a cache manager 812, volatile memory 814, and an input/output interface 818. The input/output interface 818 receives storage commands 824 from the host and returns data and/or a response to the host for each command. The input/output interface 818 may be configured to receive storage commands 824 comprising logical addresses that uniquely identify sets of data blocks stored on the non-volatile memory 806. The storage controller 804 services the storage commands 824 (e.g., read commands 826, write commands 828, storage device maintenance operations, and the like) using a physical address provided by the cache manager 812. The volatile memory 814 is typically limited in size and stores a mapping table cache 816. The mapping table cache 816 may comprise a set of segments 834, the segments 834 each comprising an address mapping between LBAs 830 and physical block addresses 832.

The cache manager 812 is configured to load segments from the address mapping table 810 in non-volatile memory 806 into the mapping table cache 816 in volatile memory 814. The cache manager 812 is configured to store modified segments of the volatile memory 814 mapping table cache 816 in the non-volatile memory 806 address mapping table 810. The cache manager 812 includes a cache segment manager 820 and a cache loader 822.

"Cache loader" refers to any hardware, software, firmware, circuit, electronic component, module, logic, device, or apparatus configured, programmed, designed, arranged, or engineered to load data from a non-volatile storage media to a cache, that may be stored in a volatile storage media. The cache loader may load data in fixed or variable size portions or data blocks. In one embodiment, the cache loader loads data into a cache in a fixed size such as a segment. In addition, or alternatively, in one embodiment, a cache loader may retrieve an uncached segment from an address mapping table stored on non-volatile storage media, and load the uncached segment into a cache. The cache loader 822 is configured to determine, in response a cache miss and a fill cache, a cache eviction candidate based on one or more correlation metrics and on a logical address of a storage command (e.g., read command or write command) and to replace the cache eviction candidate in the mapping table cache 816 with a replacement segment that may correspond to the logical address of the storage command. In another embodiment, rather than the cache loader 822, the cache manager 812 may replace the cache eviction candidate with the replacement segment. In one embodiment, the cache loader 822 identifies a cache eviction candidate based on one or more correlation metrics of the segment that satisfy an eviction threshold.

"Storage command" refers to any command relating with a storage operation. Examples of storage commands include, but are not limited to, read commands, write commands, administrative commands, maintenance commands, diagnostic commands, test mode commands, and any other command a storage controller may receive from a host or issue to another component, device, or system. "Read command" refers to a type of storage command that reads data from memory cells. "Write command" refers to a storage command configured to direct the recipient to write, or store, one or more data blocks on a persistent storage media, such as a hard disk drive, non-volatile memory media, or the like. A write command may include any storage command that may result in data being written to physical storage media of a storage device. The write command may include enough data to fill one or more data blocks, or the write command may include enough data to fill a portion of one or more data blocks. In one embodiment, a write command includes a starting LBA and a count indicating the number of LBA of data to write to on the storage media.

An eviction threshold is a criterion that defines when a segment should be evicted from a mapping table cache. Specifically, in one embodiment, an eviction threshold defines a level that a correlation metric should stay above to avoid being evicted from the mapping table cache. In a certain embodiment, the eviction threshold is a minimum number of times that a segment is referenced by a storage command serviced by the storage device 802 in order to avoid being evicted from the mapping table cache. In other words, in certain embodiments, the eviction threshold may be a minimum level that a correlation metric should reach, or exceed or else the segment will be evicted from the mapping table cache.

In the disclosed system, the cache segment manager 820 may be configured to manage an LBA correlation table, such as the one illustrated in FIG. 6. The LBA correlation table may comprise a correlation metric for each of a plurality of segments based on read command 826 requests for LBAs 830 corresponding to the plurality of segments 834. The cache loader 822 may be configured to retrieve an uncached segment 838 from the address mapping table 810 of the non-volatile memory 806 when the uncached segment 838 has a higher correlation metric than one or more correlation metrics of a resident segment 836 and other segments 834 in the mapping table cache 816. "Uncached segment" refers to a segment that does not reside in a cache, either an independent cache, a primary cache or a cache tier in a cache hierarchy. "Resident segment" refers to a segment stored, loaded, or otherwise occupying a cache and/or memory of a cache.

Figure 9:
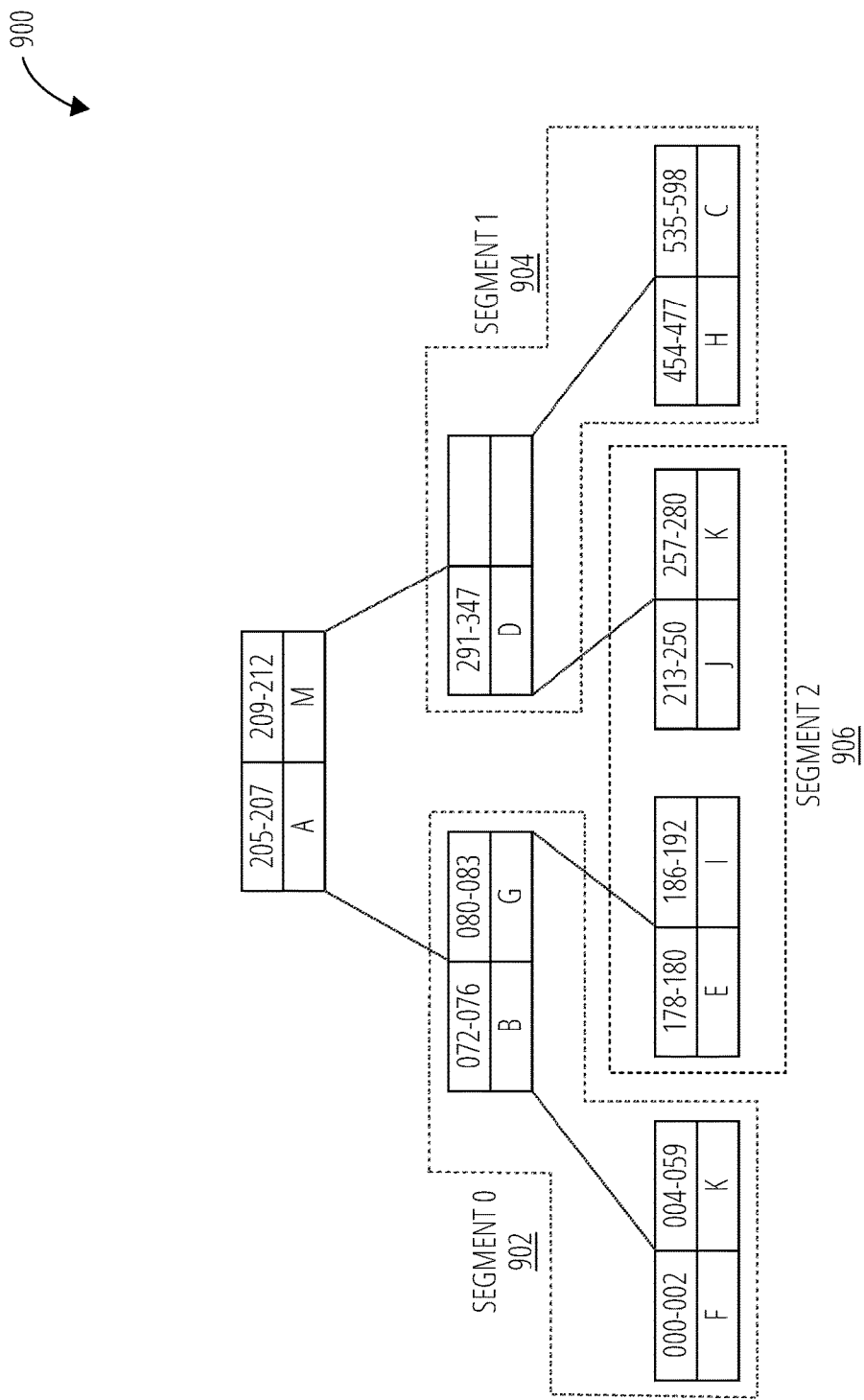
FIG. 9 illustrates an address mapping table 900 in accordance with one embodiment.
Figure 10:
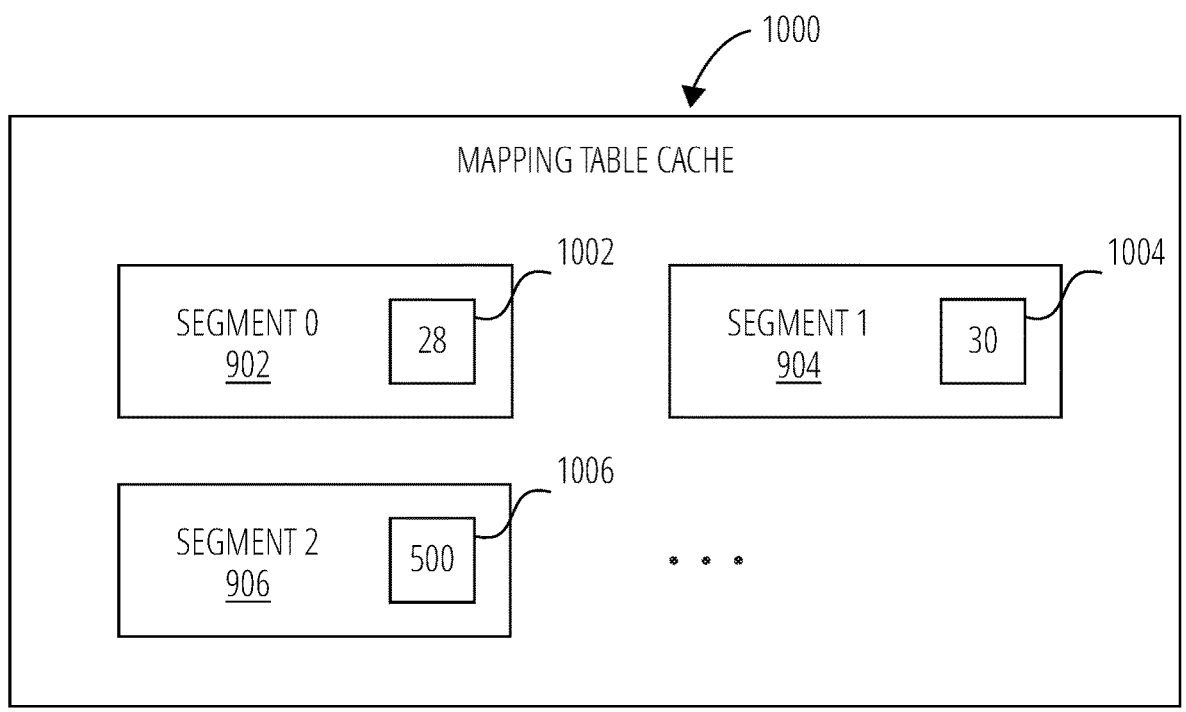
FIG. 10 illustrates a mapping table cache 1000 in accordance with one embodiment.

FIG. 9 and FIG. 10 depict additional embodiments of an address mapping table 900 and a mapping table cache 1000. Based on correlation metrics, a cache manager may adjust segment size, definition, and/or composition to improve performance of the memory device. The cache manager may make these adjustments dynamically, "on the fly." For example, segment 0 410 and segment 1 412, as illustrated in FIG. 4, may be adjusted to form segment 0 902 and segment 1 904, with certain LBA ranges (e.g., those with similar correlation metrics) reallocated to a new segment 2 906 as shown in FIG. 9.

This may allow the mapping table cache 1000 to maintain a new segment having a higher hit rate, which may ensure that highly correlated address ranges are well represented within the cache. For example, segment 0 410 and segment 1 412 may have segment 0 hit rate 502 and segment 1 hit rate 504 respectively when defined as illustrated in address mapping table 400 and mapping table cache 500. However, a cache manager may determine that a different configuration of segments may yield a segment 2 906 having a segment 2 hit rate 1006 that is higher than the segment 0 hit rate 1002 and segment 1 hit rate 1004 for new configurations of segment 0 902 and segment 1 904, respectively.

In some embodiments, managing the mapping table cache 1000 may comprise prefetching a segment comprising a second logical address into the mapping table cache 1000, wherein the correlation metric satisfies a prefetch threshold. Mapping table cache 1000 management may also comprise evicting a segment from the mapping table cache, the evicted segment comprising a logical address having the correlation metric that satisfies an eviction threshold. Management of the mapping table cache 1000 may include changing a segment size for segments of the mapping table cache, such as reducing segment 0 410 to segment 0 902 as reflected in the illustrated address mapping table 400 and address mapping table 900.

Storage controller management tables may be configured based on the correlation metric associating the logical address to a second logical address. "Storage controller management table" refers to a data structure configured to track, record, or monitor a statistic, condition, and/or setting in relation to operation of a storage controller. Those of skill in the art will recognize that the storage controller management table may comprise a generic term used to refer to a variety of data structures, including a structure comprising rows and columns, and may be implemented using a variety of data structures including an array, lists, a database, a file, a set of registers, and the like.

Examples of storage controller management tables include, but are not limited to, a list of data blocks or physical or logical erase blocks that are still open (i.e., a user may write more data into them without erasing), or physical or logical erase blocks that have large numbers of invalidated data blocks (i.e., the user for example deleted something, but the data is still in the block since you can only erase full block and not partial block), and the like.

In certain embodiments, the correlation metric may be used to make other storage controller management decisions. At least two segments of a mapping table cache may be combined based on the correlation metric between the first logical address and the second logical address and another correlation metric for a pair of other logical addresses included within the at least two segments, as reflected by the combination of portions of segment 0 410 and segment 1 412 to form segment 2 906.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method, comprising:
    receiving a first logical address associated with a first read command, the first logical address associated with a first segment of an address mapping table;
    receiving a second logical address associated with a second read command, the second logical address associated with a second segment of the address mapping table;
    increasing a correlation metric that associates the first logical address to the second logical address in response to receiving the first logical address before the second logical address;
    wherein the first logical address and the second logical address each map to a physical address within the address mapping table;
    a mapping table cache is configured to store two or more segments;
    managing the mapping table cache using the correlation metric;
    prefetching the second segment comprising the second logical address into the mapping table cache, in response to the correlation metric satisfying a prefetch threshold;
    and decreasing the correlation metric in response to receiving the second logical address before the first logical address.

2. The method of claim 1, wherein decreasing the correlation metric further comprises:
    applying a reduction weighting factor to the correlation metric such that the correlation metric decreases in response to also determining that the first logical address is received within an anticorrelation window that spans receipt of the second logical address before the first logical address.

3. The method of claim 1, further comprising:
    decreasing the correlation metric in response to receiving the second logical address before the first logical address within an anticorrelation window; and
    wherein increasing the correlation metric further comprises increasing the correlation metric in response to receiving the second logical address within a correlation window.

4. The method of claim 3, wherein the correlation window is smaller than the anticorrelation window.

5. The method of claim 1, wherein increasing the correlation metric further comprises:
    applying an increment weighting factor to the correlation metric such that the correlation metric increases in response to receiving the second logical address within a correlation window that spans receipt of the first logical address before the second logical address.

6. The method of claim 1, wherein increasing the correlation metric further comprises:
    applying a zero weighting factor to the correlation metric such that the correlation metric is unchanged in response to determining that the second logical address is received outside a correlation window measured from receipt of the first logical address.

7. The method of claim 1, wherein managing the mapping table cache comprises one of:
    evicting a segment from the mapping table cache, the segment comprising the first logical address having the correlation metric that satisfies an eviction threshold;
    changing a segment size for the two or more segments of the mapping table cache;

configuring storage controller management tables based on the correlation metric associating the first logical address to the second logical address; and combining at least two of the two or more segments of the mapping table cache based on the correlation metric between the first logical address and the second logical address and another correlation metric for a pair of other logical addresses included within the at least two of the two or more segments.

8. The method of claim 1, further comprising:

each of the two or more segments comprising a logical address and a corresponding physical address for data blocks stored on non-volatile storage media; and tracking a hit rate for each of the two or more segments in the mapping table cache.

9. The method of claim 1, wherein the first logical address and the second logical address comprise logical block addresses (LBAs) and each of the two or more segments comprises one or more LBA ranges that together represent a portion of the address mapping table stored on non-volatile storage media.

10. An apparatus, comprising:

a processor; and a memory storing instructions that, when executed by the processor, configure the apparatus to:

receive a first read command comprising a first logical address, wherein a first segment of an address mapping table comprises the first logical address;

receive a second read command comprising a second logical address, wherein a second segment of the address mapping table comprises the second logical address;

increase a correlation metric that correlates the first segment to the second segment in response to a mapping table cache failing to include the second segment and in response to receiving the first read command comprising the first logical address before receiving second read command comprising the second logical address;

manage the mapping table cache based on the correlation metric;

prefetching the second segment comprising the second logical address into the mapping table cache, in response to the correlation metric satisfying a prefetch threshold;

and decrease the correlation metric in response to the mapping table cache failing to include the first segment and in response to receiving the second logical address before receiving the first logical address.

11. The apparatus of claim 10, wherein decreasing the correlation metric further comprises:

apply a reduction weighting factor to the correlation metric such that the correlation metric decreases in response to also determining that the first logical address is received within an anticorrelation window that spans receipt of the second logical address before the first logical address.

12. The apparatus of claim 10, wherein the instructions further configure the apparatus to:

decrease the correlation metric in response to receiving the second logical address before receiving the first logical address within an anticorrelation window that spans receipt of the second logical address before the first logical address; and wherein increasing the correlation metric further comprise increasing the correlation metric in response to receiving the second logical address within a correlation window that spans receipt of the first logical address before the second logical address.

13. The apparatus of claim 10, wherein increasing the correlation metric further comprises:

apply an increment weighting factor to the correlation metric such that the correlation metric increases in response to determining that the second logical address is received within a correlation window that spans receipt of the first logical address before the second logical address.

14. The apparatus of claim 10, wherein increasing the correlation metric further comprises:

applying a zero weighting factor to the correlation metric such that the correlation metric is unchanged in response to determining that the second logical address is received outside a correlation window measured from receipt of the first logical address.

15. The apparatus of claim 10, wherein managing the mapping table cache comprises one or more of:

evicting a segment from the mapping table cache, the segment comprising the first logical address having the correlation metric that satisfies an eviction threshold;

configuring storage controller management tables based on the correlation metric associating the first logical address to the second logical address; and combining at least two segments of the mapping table cache based on the correlation metric between the first logical address and the second logical address and one or more of correlation metrics for the at least two segments.

16. The apparatus of claim 10, wherein the instructions further configure the apparatus to:

populate the mapping table cache with at least two segments, each segment comprising one or more logical addresses and corresponding one or more physical addresses for data blocks stored on non-volatile storage media; and track a hit rate for each of the at least two segments in the mapping table cache.

17. The apparatus of claim 10, wherein the first logical address and the second logical address comprise logical block address (LBAs) and each of the first and second segments comprises one or more LBA ranges that together represent a portion of the address mapping table stored on non-volatile storage media.

* * * * *